Dec. 9, 1941.    O. E. COTE    2,265,266
SQUEEGEE
Filed Jan. 3, 1939
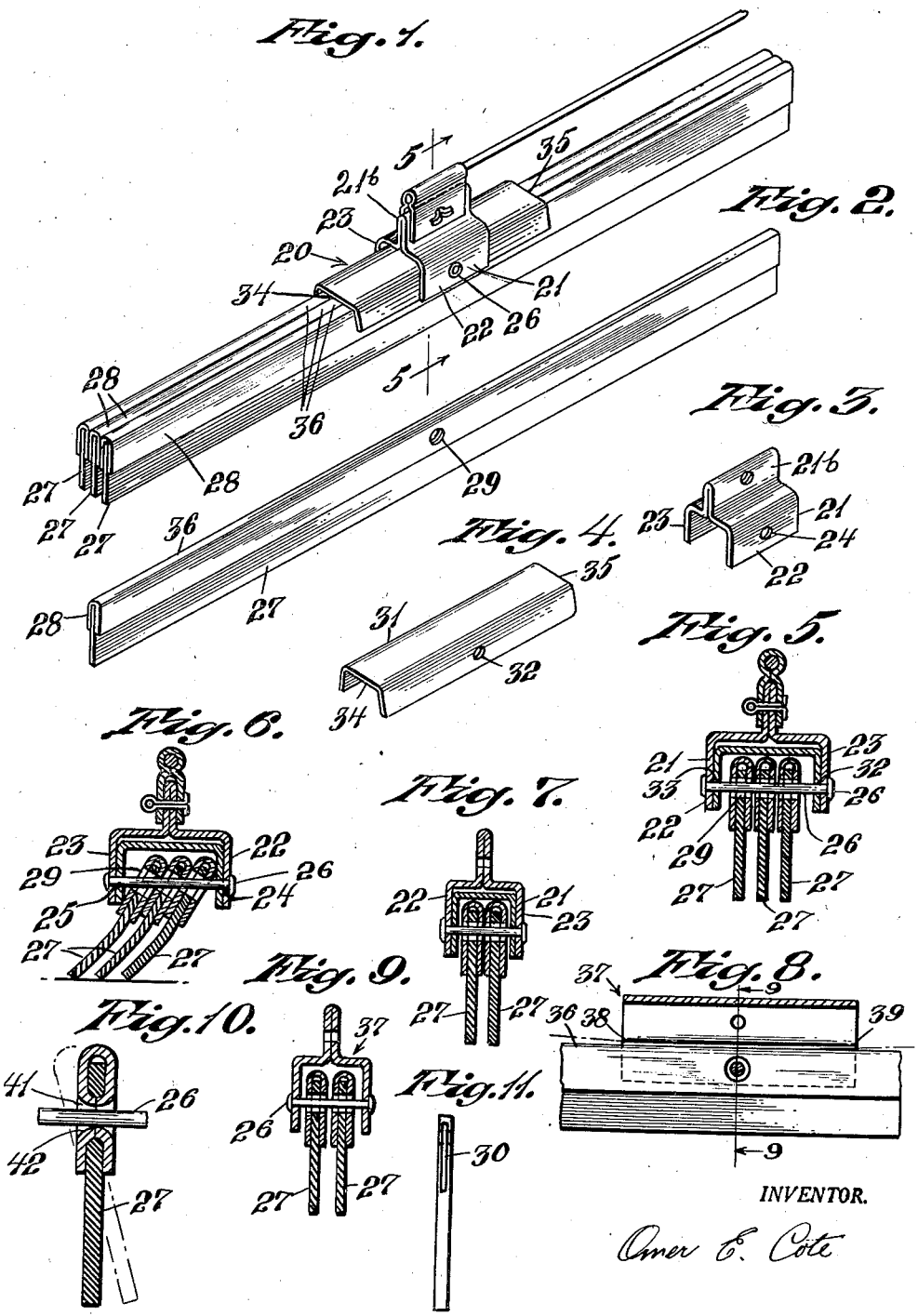
INVENTOR.
Omer E. Cote Patented Dec. 9, 1941

2,265,266

UNITED STATES PATENT OFFICE 2,265,266

SQUEEGEE

Omer E. Cote, Providence, R. I.

Application January 3, 1939, Serial No. 248,931

4 Claims. (Cl. 15—245)

This invention relates to improvements in squeegees and more particularly to a squeegee having a plurality of wiping edges.

Windshield cleaner squeegees having a plurality of wiping edges have been proposed prior to my invention. In some of these prior devices a plurality of plies of flexible material substantially equal in width are clamped together by a metal backing strip providing a plurality of wiping edges. In this form of squeegee only the ply adjacent the surface being wiped is effective in removing foreign matter from the surface being cleaned. In other prior devices a plurality of plies of wiping strips stepped widthwise are clamped together by a metal backing strip. This form of squeegee requires a critical adjustment of the proper angle of tipping in order to have the edges of the wiping strips properly contact the surface being cleaned. Further, if an insufficient pressure is applied to this blade there will not be a proper contact of all the wiping edges on the surface being cleaned. In other forms the plurality of edges are provided in a molded blade having an enlarged portion provided with projections thereon.

One object of this invention is to provide a squeegee having a plurality of wiping strips differing from these described in that each strip is capable of independent alignment with the surface to be cleaned.

Another object of the invention is the provision of a windshield cleaner squeegee having a plurality of wiping edges each capable of movement independent of each other.

An additional object of the invention is the provision of a windshield cleaner squeegee which will readily reverse its angle of tipping at the end of the swing of the wiper arm.

A further object of the invention is the provision of a windshield cleaner squeegee having pluralities of wiping edges requiring a minimum pressure on the blade in order that each edge properly engage the surface to be cleaned.

A still further object of the invention is the provision of a windshield cleaner squeegee having a plurality of wiping strips capable of being readily freed of water or snow which may become lodged between the wiping strips.

With these and other objects in view, the invention consists of certain features as will be hereinafter more fully described and claimed, and illustrated in the accompanying drawing, in which Fig. 1 is a perspective view of a windshield cleaner squeegee made according to this invention;

Fig. 2 is a perspective view of a wiper strip;

Fig. 3 is a perspective view of the wiper strip support shown in Fig. 1;

Fig. 4 is a perspective view of a detail;

Fig. 5 is a sectional view taken substantially on line 5—5 of Fig. 1;

Fig. 6 is a view similar to that shown in Fig. 5 and showing the edges of the wiping strips engaging a surface;

Fig. 7 is a view similar to that shown in Fig. 5 but illustrating a squeegee having a lesser number of wiping strips;

Fig. 8 is a longitudinal view, partially in section, of a fragmentary portion of a modified form of wiping strip support;

Fig. 9 is a sectional view taken substantially on line 9—9 of Fig. 8;

Fig. 10 is a sectional edge elevational view of a wiper strip provided with a modified bearing opening; and Fig. 11 is an edge elevational view of a modified wiper strip.

In carrying out my invention I provide a plurality of thin strips of a flexible material substantially of equal widths and I movably mount these strips on a support in such a manner that each strip has a relative and independent movement. This provides for each strip to readily change its relative position at the beginning of each stroke of the wiper arm so as to properly position its wiping edge on the surface being cleaned. This relative movement of the wiping strips being possible at all angles of so-called tipping.

These strips are preferably made of a rubbery material or some such material which has the properties required in a wiping strip. Each strip is preferably provided with a reinforced portion extending along a longitudinal edge thereof, preferably formed by clamping a U-shaped metal backing over an edge of the strip.

One manner of mounting these strips is to provide each strip with a bearing opening of a size to loosely receive a mounting pin or the like which extends between the spaced walls of a support. This support is provided with a suitable portion to which a wiper arm of a windshield cleaning device may be attached.

By this arrangement each wiping strip is individually rockable about the mounting pin, which enables each wiping edge to conform to the surface being cleaned and thereby present uniformly good wiping edges. Since each strip is individually movable about the mounting pin a relatively less pressure will be required to properly position the edges of the wiping strip which come into contact with the surface being cleaned, thereby not unduly burdening the cleaner motor and providing a squeegee which will more readily reverse its angle of tipping at the end of the wiping stroke as the device oscillates.

Referring to the drawing for a more detailed description of the invention, the numeral 20 designates generally the squeegee which consists of a support 21, which support may be formed in various ways to provide the proper attaching means for various styles of wiper arms commonly used. This support may conveniently be constructed as shown in the drawing, having spaced side portion 22, and 23, and an extension 21b to which is attached the wiper arm of a windshield cleaner device, not shown. These side portions 22 and 23 are provided with aligned openings 24 and 25 to receive a mounting pin 26 or the like which may be a bolt, cotter pin, or other suitable device. In the present instant this mounting pin 26 is in the form of a tubular rivet extending through the openings 24 and 25 and having the ends upset adjacent the outer surfaces of the portions 22 and 23 which secures the pin 26 in position in a manner well known.

The wiping elements 27 are preferably relatively thin flexible strips of a rubbery material, each having a reinforced metal backing 28 and provided with an opening 29 of a size to loosely receive the mounting pin 26. In some instances these wiping elements may be formed as shown in Fig. 11 as by molding these strips with a metal reinforced portion 30 embedded therein.

The walls or side portions 22 and 23 are spaced sufficiently to provide enough space to enable the wiping strips to slant at the proper angle in order to have the edge of each strip properly engage the surface as substantially shown in Fig. 6.

In order to limit the amount of longitudinal movement of these wiping strips to prevent an excess movement thereof as when being handled prior to the squeegee being assembled to the windshield cleaner device, I position a U-shaped member 31 between the side portions 22 and 23 of the support 21 to straddle the wiping strips and secure it to this support 21 as by providing aligned openings 32 and 33 in this member 31 to receive the mounting pin 26. This provides edges 34 and 35 positioned to engage the edges 36 of the wiping strips, and arrest the longitudinal movement of these strips when moved beyond a predetermined amount, this amount of movement depending on the relative space between the edges 34, 35 and 36. In some instances I may dispense with this U-shaped member 31 and provide a support 37 of sufficient length to position the edges 38 and 39 to engage the edges 36 of the wiping strips a substantial distance from the mounting pin 26 as is shown in dash and dot lines in Fig. 8.

In order to facilitate the reversing of the squeegee at the end of the wiping stroke I may provide in some cases a modified bearing opening 41 as shown in Fig. 10. This opening may be conveniently formed by forcing inwardly on a curve the material at the edges of the opening thus providing a bearing opening having a convex surface 42 to reduce the amount of surface engaged by the mounting pin 26.

My improved squeegee is very simple and practical in construction and effective in its operation. In having the wiping strips mounted as herein shown and described, only a single mounting pin is necessary and each wiping strip may move about this mounting pin in the longitudinal plane of the strips and also rock sideways. These wiping strips will properly engage the surface being cleaned when the squeegee is tipped at any angle ranging within near the vertical and close to the horizontal relative to the surface being cleaned. However, for all practical purposes the spacing of the side portions of the member 31 is such that the angle of tipping will be limited by the engagement of these side portions with some portion of the adjacent wiping strip. In such construction of squeegee which dispense with this member 31 the spacing of the side portion 22 and 23 of the support 21 will be such as to similarly engage some portion of the adjacent wiper strip to limit the angle of tipping. When the squeegee is caused to change its angle of tipping at the beginning of the wiping stroke as the cleaner arm oscillates, the wiping strips slide against each other in changing their relative position and in so sliding will free themself more or less of excess water or snow which may have become lodged between the strips.

It is to be understood that the form of my invention herewith shown and described is to be taken as a preferred example of the same, and that various changes in the shape, size, and arrangement of parts may be resorted to, without departing from the spirit of the invention, or the the scope of the appended claims.

I claim:

1. A windshield cleaning device, comprising a support having spaced side walls providing a channel therebetween and a portion spaced from said walls adapted to be secured to the attaching member of a wiper arm, a pivot pin extending through and secured to said walls, a plurality of wiping strips loosely pivoted on said pin and rockable thereon both in a longitudinal and lateral direction and in juxtaposition in said channel, said strips being secured in position only by said pivot pin and in contact with each other during the travel of the strips across the surface wiped and in sliding engagement with each other at each change in direction of travel and means for limiting the amount of movement of said strips about said pivot pin in a longitudinal direction, comprising a U-shaped member positioned in said channel and straddling said strips and with the bight thereof engageable by said strips upon a predetermined movement of said strips about said pin in a longitudinal direction.

2. a windshield cleaning device, comprising a support having side walls providing a channel therebetween and a portion spaced from said walls adapted to be secured to the attaching member of a wiper arm, a pivot pin extending through and secured to said walls, a plurality of wiping strips, each provided with a reinforcing backing strips extending along the upper edge thereof and loosely pivoted on said pin and rockable thereon both in a longitudinal and lateral direction and in juxtaposition in said channel, said strips being secured in position in said channel only by said pivot pin and in contact with each other during the travel of the strips across the surface wiped and in sliding engagement with each other at each change in direction of travel, and a U-shaped member positioned in said channel and straddling said strips and with the bight thereof engageable by the upper surface of said strips upon a predetermined movement of said strips about said pin in a longitudinal direction.

3. A windshield cleaning device comprising a support having spaced side walls providing a channel and a portion spaced from said walls and adapted to receive the attaching member of a wiper arm, a U-shaped member positioned in said channel, a pivot pin extending through the U-shaped member and the said side walls, a plurality of flexible wiping strips each provided with a metal reinforced portion extending along the length thereof, said strips being positioned in the channel of said U-shaped member and in contacting engagement with each other and each freely rockable on said pin both in a longitudinal and in a lateral direction, said wiping strips being secured to said support only by said pivot pin, said U-shaped member being of less length than said strips and with the edges of the bight thereof positioned to be engaged by said strips upon a predetermined movement of said strips about said pin in a longitudinal direction.

4. A windshield cleaning device, comprising a support having side walls providing a channel therebetween and a portion spaced from said walls adapted to be secured to the attaching member of a wiper arm, a pivot pin extending through and secured to said walls, a plurality of wiping strips loosely pivoted on said pin and rockable thereon both in a longitudinal and lateral direction and in juxtaposition in said channel, said strips being secured in position only by said pivot pin and in contact with each other during the travel of the strips across the surface wiped and in sliding engagement with each other at each change in direction of travel, and means for limiting the amount of movement of said strips about said pin in a longitudinal direction, comprising a member carried by said support and of a length to extend beyond said support and provided with a portion positioned to overlie the upper edge surface of said strips in spaced relation therewith and engageable by said surface upon a predetermined movement of said strips about said pin in a longitudinal direction.

OMER E. COTE.